US008094728B2

(12) United States Patent
Morris

(10) Patent No.: US 8,094,728 B2
(45) Date of Patent: Jan. 10, 2012

(54) METHOD FOR CREATING A CUSTOMIZED TV/RADIO SERVICE FROM USER-SELECTED CONTENTS AND PLAYBACK DEVICE USING THE SAME

(75) Inventor: Steven Morris, Hsinchu (TW)

(73) Assignee: Arcadyan Technology Corporation, Hsinchu (TW)

( * ) Notice: Subject to any disclaimer, the term of this patent is extended or adjusted under 35 U.S.C. 154(b) by 1527 days.

(21) Appl. No.: 11/469,913

(22) Filed: Sep. 5, 2006

(65) Prior Publication Data
US 2008/0056673 A1 Mar. 6, 2008

(51) Int. Cl.
*H04N 7/12* (2006.01)
(52) U.S. Cl. .............................. 375/240.26; 375/240.01
(58) Field of Classification Search .................. 375/240, 375/240.01, 240.26; 725/34, 38
See application file for complete search history.

(56) References Cited

U.S. PATENT DOCUMENTS 7,634,785 B2 * 12/2009 Smith ............................. 725/34
2003/0093790 A1 * 5/2003 Logan et al. .................... 725/38
* cited by examiner

*Primary Examiner* — Allen Wong
(74) *Attorney, Agent, or Firm* — Thomas|Kayden

(57) ABSTRACT

A method for creating a customized TV/radio service from user-selected contents is disclosed. The method is applied to a playback device for receiving a number of digital audio/video services. The method includes decoding the received digital audio/video services to obtain a plurality of content elements and metadata corresponding to the content elements; examining the digital audio/video services to determine breaks between the content elements; checking the associated metadata for each content element against a list of user-provided keywords/genres corresponding to the user-selected contents; recording the content elements, a plurality of advertisements and associated keywords describing contents of the advertisements when the corresponding metadata substantially match at least one of the user-selected contents; and constructing a playlist of the recorded contents for the user to create the customize TV/radio service when the user wishes to play the recorded contents.

19 Claims, 3 Drawing Sheets

METHOD FOR CREATING A CUSTOMIZED TV/RADIO SERVICE FROM USER-SELECTED CONTENTS AND PLAYBACK DEVICE USING THE SAME

BACKGROUND OF THE INVENTION

1. Field of the Invention

The invention relates in general to a method for creating a customized TV/radio service from user-selected contents and playback device using the same, and more particularly to a method for automatically creating a playlist for user-selected contents with inserted advertisements and playback device using the same.

2. Description of the Related Art

There are several forms of digital streaming content available to consumers today. The most common forms are digital television, digital radio, or streaming Internet radio. Each of these includes some form of metadata to identify the content currently being transmitted. This may give the name and description of the show (for digital TV content or for talk radio shows) or the artist and title of a song (in the case of music radio).

Receivers may present this information to the user, but it is rarely used for other purposes. In some digital TV systems, this is used to offer recommendations to users or to schedule automatic recordings on a personal video recorder (PVR) device, but it is otherwise usually only for consumption by the user. In an Internet radio scenario, this metadata is only available after the song or show has started playing.

Many PVR products currently exist that will automatically record television shows that may be of interest to a viewer, based on explicit preferences and viewer behavior, for example the Tivo, Replay TV, and Sky+ services. At present, however, users are limited to watching content one item at a time and must manually select the next item to watch. While this is acceptable for 30-minute TV shows, it is not acceptable for 3-4 minute songs.

From the broadcaster's perspective, there is another problem with this model of watching television. The user will only see those advertisements that occur in ad breaks within the show (and may not see those due to ad-skipping functionality in some PVR devices). Advertisements shown between shows will usually not be recorded and so viewers using PVR devices will not see them. This may lead to decreased ad revenues as more users use PVR systems and thus fewer viewers watch advertisements between shows, reducing the amount that broadcasters can charge for those ad slots.

SUMMARY OF THE INVENTION

It is therefore an object of the invention to provide a method for creating a customized TV/radio service from user-selected contents and playback device using the same. A playlist for user-selected content is automatically created according to the user's preferences with inserted targeted advertisements to make use easier for the consumer and increase ad audience.

The invention achieves the above-identified object by providing a method for creating a customized TV/radio service from user-selected contents. The method is applied to a playback device for receiving a number of digital audio/video services. The method includes decoding the received digital audio/video services to obtain a plurality of content elements and metadata corresponding to the content elements; examining the digital audio/video services to determine breaks between the content elements; checking the associated metadata for each content element against a list of user-provided keywords/genres corresponding to the user-selected contents; recording the content elements, a plurality of advertisements and associated keywords describing contents of the advertisements when the corresponding metadata substantially match at least one of the user-selected contents; and constructing a playlist of the recorded contents for the user to create the customize TV/radio service when the user wishes to play the recorded contents.

The invention achieves the above-identified object by providing a playback device for playing back a plurality of digital audio/video services according to user-selected contents. The playback device includes a receiver and a processing unit, and the processing unit includes a monitor unit, a storage unit and a creation unit. The monitor unit is coupled to the receiver for monitoring the received digital audio/video services according to the user-selected contents, and outputting contents of the monitored digital audio/video services that substantially match the user-selected contents. The storage device is coupled to the monitor unit for recording the contents of the monitored digital audio/video services that substantially match the user-selected contents. The creation unit is coupled to the monitor unit for creating a playlist of the contents of the matched digital audio/video services for the user to choose from.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1A:
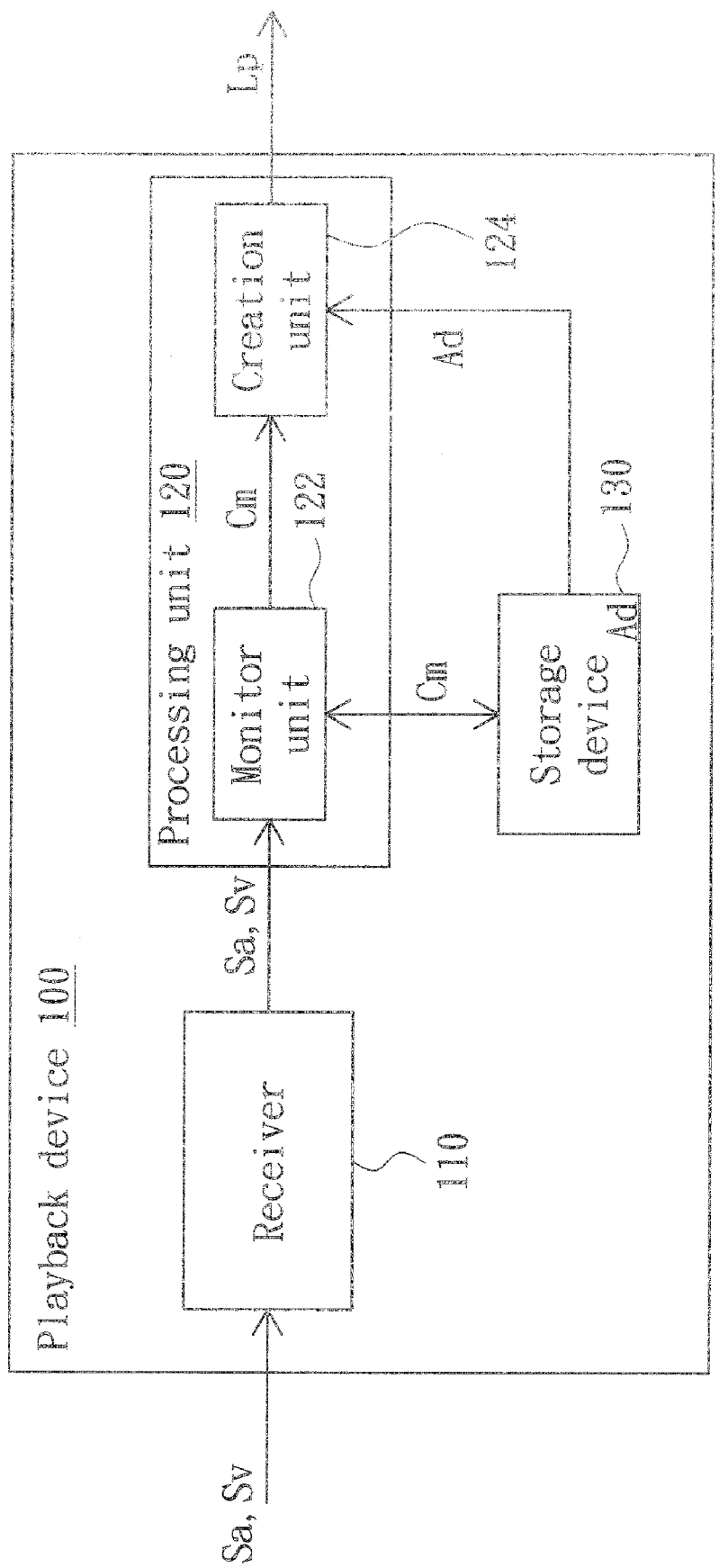
FIG. 1A is a block diagram of a playback device according to a preferred embodiment of the invention.

Referring to FIG. 1A, a block diagram of a playback device according to a preferred embodiment of the invention is shown. The playback device 100, connected to a broadcast network or an IP network, is used for playing streamed digital audio/video services, such as digital audio broadcasting (DAB) digital radio or digital TV services, or internet radio services or (internet protocol television (IPTV) services according to user-selected contents (i.e. user's preferences). Each service contains metadata describing the contents of the service. The playback device 100 includes a receiver 110, a processing unit 120 and a storage device 130.

The receiver 110 is used for receiving the digital audio/video services Sa or Sv. The processing unit 120, coupled to the receiver 110, includes a monitor unit 122 and a creation unit 124. The monitor unit 122 is coupled to the receiver 110 for monitoring the received digital audio/video services Sv or Sa according to the user-selected contents, such as a selection of specific TV shows or radio music, and outputting the contents Cm of the monitored digital audio/video services Sa or Sv, which match or are similar to the user-selected contents. The storage device 130 is coupled to the monitor unit 122 for recording the contents of the monitored digital audio/video services that substantially match the user-selected contents.

The monitor unit 122 may detect the content of an ad break from the received digital audio/video services Sa or Sv and records the content elements Cm (advertisements Ad) of the ad break into the storage device 130 by associating with a set of keywords describing the content after the ad break. Or the storage device 130 can store a selection of advertisements Ad and their associated keywords loaded by a device manufacturer, which are updated while the playback device 100 is in a standby mode.

Besides, the creation unit 124 is coupled to the monitor unit 122 and the storage device 130 for creating a playlist Lp from the contents Cm of the matched digital audio/video services Sa or Sv for the user according to the advertisements Ad so as to create a customized TV/radio service.

As mention above, if the playback device 100 is connected to a broadcast network, the number of the digital audio/video services Sa or Sv that can be monitored by the monitor unit 122 is decided by the number of tuners (not shown in the figure) in the playback device 100. If the playback device 100 is connected to an IP network, the number of the digital audio/video services Sa or Sv that can be monitored by the monitor unit 122 is decided by processing power of the processing unit 120 and bandwidth of the receiver 110.

Figure 1B:
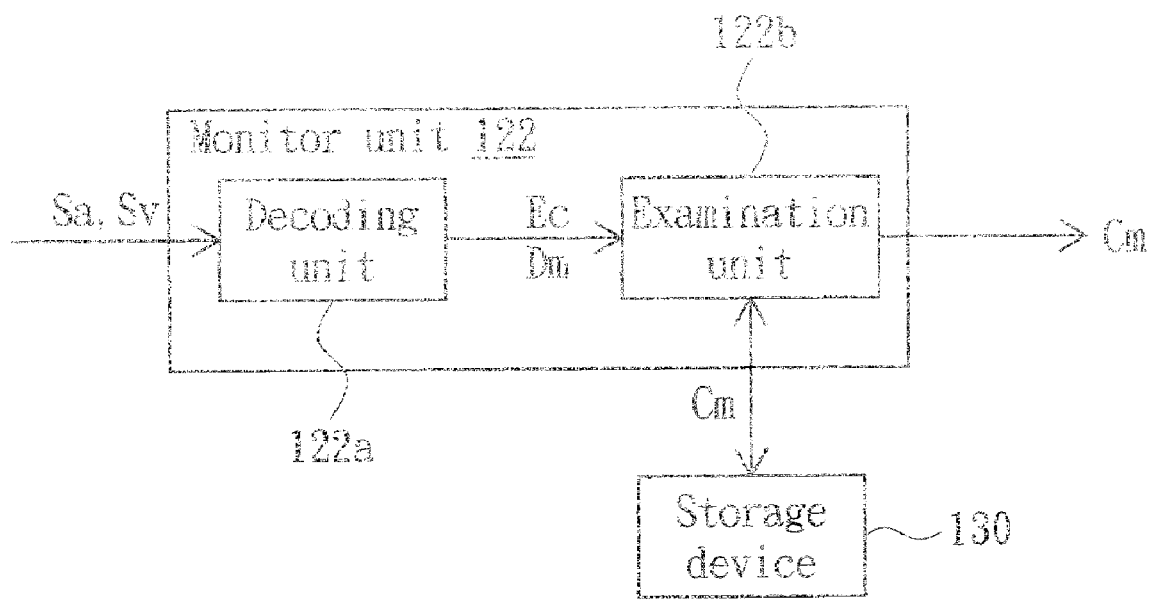
FIG. 1B is a block diagram of the monitor unit in FIG. 1A.

Referring to FIG. 1B, a block diagram of the monitor unit 122 in FIG. 1A is shown. The monitor unit includes a decoding unit 122a and an examination unit 122b. The decoding unit 122a is used for decoding the received digital audio/video services Sa or Sv and outputting a number of content elements Ec and the metadata Dm corresponding to the content elements. For example, the content elements Ec include shows of a TV or talk radio services, and songs of a music radio service and the associated metadata Dm are respectively the name and description of the current show for the TV or talk radio service and the artist and title of the song for the music radio service.

The examination unit 122b is coupled to the decoding unit 122a for checking the metadata for each content element against the user-selected contents, and recording the content elements Cm with the metadata Dm substantially matching at least one of the user-selected contents into the storage device 130.

In addition to the content elements Cm, the storage device Cm also stores the metadata Dm corresponding to the matched content elements Cm, data generated based on analysis of the matched content elements Cm, and the related genres/artists of the matched content elements Cm retrieved from an external database, such as a CD database (CDDB) service.

Figure 1C:
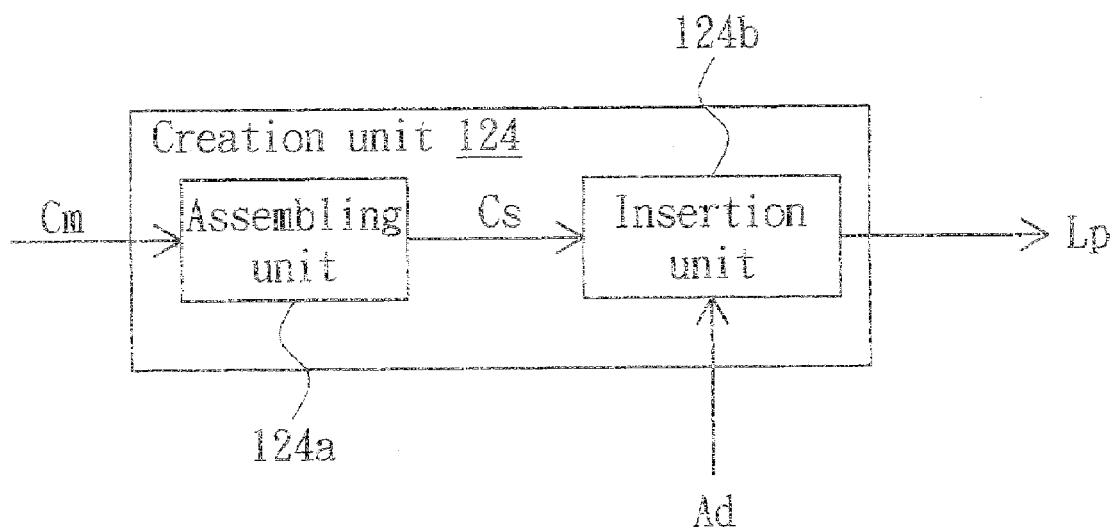
FIG. 1C is a block diagram of the creation unit in FIG. 1A.

Referring to FIG. 1C, a block diagram of the creation unit 124 in FIG. 1A is shown. The creation unit 124 includes an assembling unit 124a and an insertion unit 124b. The assembling unit 124a is used for adding and grouping the recorded content elements Cm with the same genre or a similar description, and outputting assembled content elements Cs. The insertion unit 124b is coupled to the assembling unit 124a for inserting an advertisement from the recorded advertisements Ad according to the associated keywords when the total playing time of the assembled content elements Cs is greater than a present time. When the user wishes to play the recorded contents, the processing unit 120 automatically presents the playlist Lp of the recorded contents for the user to choose from. Therefore, the prior-art issue can be prevented that users can watch only one item of content at a time and have to select the next item to watch manually.

Figure 2:
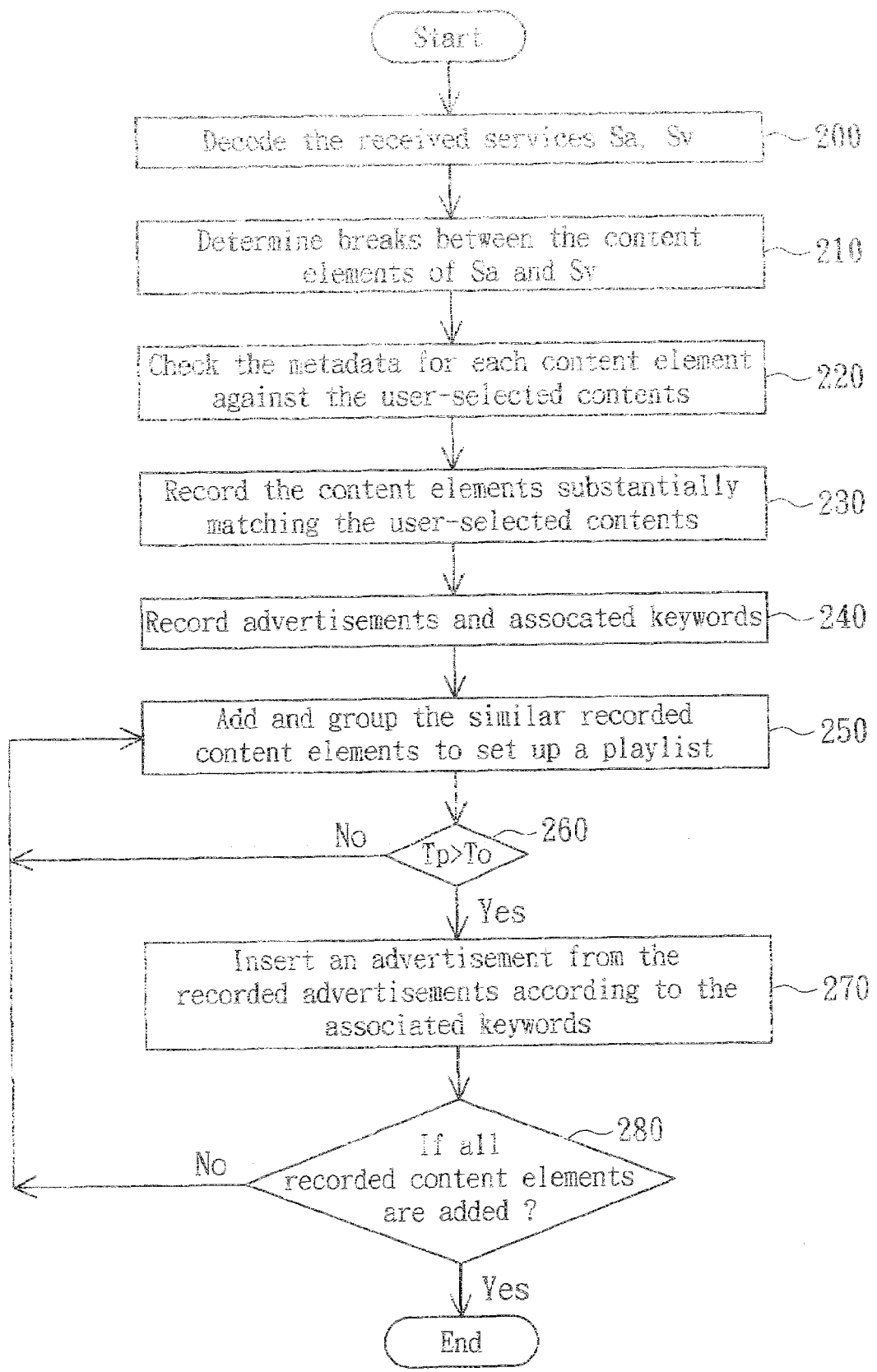
FIG. 2 is a flow chart of the method for creating a customized TV/radio service from user-selected contents according to the preferred embodiment of the invention.

Referring to FIG. 2, a flow chart of the method for creating a customized TV/radio service from user-selected contents according to the preferred embodiment of the invention is shown. The method is applied to the playback device 100 shown in FIG. 1A for receiving streamed digital audio/video services Sa or Sv, such as DAB digital radio or TV services or internet radio or IPTV services. At first, in step 200, decode the digital audio/video services Sa or Sv received by the playback device 100, for example by using the decoding unit 122a to obtain the contained content elements Cm and the associated metadata Dm. Following that, in step 210, examine the received digital audio/video services Sa or Sv to determine breaks between the contents elements Cm of Sa and Sv. In step 220, check the associated metadata Dm for each content element Cm against the user-selected contents, for example by using the examination unit 122b. The associated metadata Dm for each content element Cm are checked against a list of keywords/genres, such as topics, shows, artists or songs, provided by the user, which are maintained beforehand in the playback device 100.

Next, in step 230, record the content elements Cm with the associated metadata Dm matching or similar to at least one of the user-selected contents, the associated metadata Dm, the data generated based on analysis of the matched content elements Cm, and the related genres/artists of the matched content elements Cm retrieved from an external database, such as a CDDB database service. Some time-sensitive contents, such as news, travel, and weather information of the recorded content elements Cm are automatically updated.

Then, in step 240, record a number of advertisements Ad and their associated keywords describing contents of the advertisements Ad. As mentioned above, the advertisements Ad and associated keywords can be load onto the playback device 100 by a device manufacturer and updated while the playback device 100 is in a standby mode. Or the advertisements Ad can be recorded, such as into separate files or a single file for an entire ad break, from a detected ad break of the digital audio/video services Sa or Sv, and be associated with a first set of keywords describing the content before the ad break and a second set of keywords describing the content after the ad break.

In step 250, add and group the recorded content elements Cm with the same genre or a similar description base on the information recorded in the step 230 in order to set up the playlist Lp. Next, in step 260, determine if the total playing time Tp (or the average clip length) of the added content elements Cm is greater than a present time To. If the total playing time Tp is not greater than the present To, return to the step 250 to construct the playlist Lp continuously.

If the total playing time Tp is greater than the present time To, go to the step 270 to insert an advertisement Ad from the recorded advertisements Ad according to their associated keywords, and reset the counter for the playing time of the added content elements Cm. The advertisements Ad is inserted based on the similarity of the associated keywords to the current added content element Cm and the content element Cm that will be added following the ad break. For example, if the recorded content element Cm before the ad break is a sports program and the content element Cm after the ad break is a TV show, and the advertisement Ad, such as an Ad of Nike sports shoe, which has the first associated keyword 'sports' and the second associated keyword 'TV show'.

Finally, in step 280, determine if all the recorded content elements Cm are added into the playlist Lp. If not, continue the step 250 to add the recorded contents into the playlist Lp and if yes, the process is ended. Therefore, when the user wishes to play the recorded contents, the method of the invention can automatically present the playlist Lp of the recorded contents for the user to create a customized TV/radio service, thereby preventing the prior-art issue that users can watch only one item of content at a time and have to select the next item to watch manually.

Although the method for creating a TV/radio service from the user-selected contents are exemplified by the steps 200~280 in the embodiment, the method of the invention is not limited thereto. As long as the method can monitor the received digital audio/video services Sa or Sv, record the contents Cm of the digital audio/video services that substantially match the user-selected contents, and construct a playlist of the recorded contents for the user when the user wishes to play the recorded contents, any other alternative method will also fall in the scope of the invention.

According to the above-mentioned embodiment, the method of invention proposes a new way for users to watch recorded contents, especially short pieces of recorded contents. By reconstructing the familiar concept of a TV channel for recorded contents, the playback device makes it easier for users to watch recorded contents without having to explicitly choose each piece of content that they watch. This can be especially powerful in conjunction with automated recording functionality that records shows that may be of interest to the viewer based on past watching habits. Moreover, by including ad breaks in the contents, advertisers get the benefit of still exposing the customer to their advertisements, broadcasters get the benefit of preserving ad revenues and consumers get the benefit of advertisements that are more targeted to the contents that they watch. If advertisements are downloaded separately and not recorded from the broadcast, then the potential for successfully targeting advertisements at individual viewers is much higher.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for creating a customized TV/radio service from user-selected contents, applied to a playback device for receiving a plurality of digital audio/video services, the method comprising:
    (a) decoding the received digital audio/video services to obtain a plurality of content elements and metadata corresponding to the content elements;
    (b) examining the digital audio/video services to determine breaks between the content elements;
    (c) checking the associated metadata for each content element against a list of user-provided keywords/genres corresponding to the user-selected contents; and
    (d) recording the content elements, a plurality of advertisements and associated keywords describing contents of the advertisements when the corresponding metadata substantially match at least one of the user-selected contents; and
    (e) constructing a playlist of the recorded contents for the user to create the customize TV/radio service when the user wishes to play the recorded contents, wherein the step (e) comprises:
        (e-1) adding and grouping the recorded content elements with the same genre or a similar description to set up the playlist; and
        (e-2) determining if a total playing time of the added content elements is greater than a preset time, and if the total playing time is not greater than the preset time, returning to the step (e-1); and
        (e-3) if the total playing time is greater than the preset time, inserting an advertisement from the recorded advertisements according to the associated keywords, and resetting the counter for the playing time of the added content elements.

2. The method according to claim 1, wherein the digital audio/video services are digital audio broadcasting (DAB) digital radio services or digital TV services coming from a broadcast source.

3. The method according to claim 1, wherein the digital audio/video services are internet radio services or internet protocol television (IPTV) services coming from an internet source.

4. The method according to claim 1, wherein the metadata comprise the name and description of a current show for a TV or talk radio service or the artist and title of a song for a music radio service.

5. The method according to claim 1, wherein the step (d) comprises storing the metadata corresponding to the matched content elements, data generated based on analysis of the matched content elements, and related genres/artists of the matched content elements retrieved from an external database.

6. The method according to claim 5 wherein the external database is a CD database (CDDB) database.

7. The method according to claim 1, wherein the step (d) comprises loading the advertisements and associated keywords onto the playback device by a device manufacturer and updating the advertisements and associated keywords while the playback device is in a standby mode.

8. The method according to claim 1, wherein the step (d) comprises:
    (d-1) recording individual advertisements of an ad break detected from the digital audio/video services to separate files or recoding the entire ad break from the digital audio/video services to a single file;
    (d-2) associating the recorded advertisements with a first set of keywords describing the content before the ad break; and
    (d-3) associating the recorded advertisements with a second set of keywords describing the content after the ad break.

9. The method according to claim 1, wherein the step (e-3) comprises inserting the advertisement based on the similarity of the associated keywords to the current added content element and the content element that will be added following the ad break.

10. The method according to claim 1, further comprising updating time-sensitive contents, comprising news, travel, and weather information of the recorded contents.

11. A playback device for playing back a plurality of digital audio/video services according to user-selected contents, the playback device comprising:
    a receiver, for receiving the digital audio/video services; and
    a processing unit, coupled to the receiver, the processing unit comprising:
        a monitor unit, coupled to the receiver for monitoring the received digital audio/video services according to the user-selected contents, and outputting contents of the monitored digital audio/video services that substantially match the user-selected contents;

a storage device, coupled to the monitor unit for recording the contents of the monitored digital audio/video services that substantially match the user-selected contents; and a creation unit, coupled to the monitor unit for creating a playlist of the contents of the matched digital audio/video services for the user to choose from, wherein the creation unit comprises:

an assembling unit, for adding and grouping the recorded content elements with the same genre or a similar description to set up the playlist; and an insertion unit, coupled to the assembling unit for inserting an advertisement from the recorded advertisements according to the associated keywords and resetting a counter for the playing time of the added content elements when the total playing time of the added content elements is greater than a preset time.

12. The playback device according to claim 11, wherein the digital audio/video services are DAB digital radio services or digital TV services coming from a broadcast source, and the number of the digital audio/video services that can be monitored by the monitor unit is decided by the number of tuners in the playback device.

13. The playback device according to claim 11, wherein the digital audio/video services are internet radio services or IPTV services coming from an internet source, and the number of the digital audio/video services that can be monitored by the monitor unit is decided by processing power of the power unit and bandwidth of the receiver.

14. The playback device according to claim 11, wherein the monitor unit comprises:

a decoding unit, for decoding the received digital audio/video services, outputting a plurality of content elements and metadata corresponding to the content elements; and an examination unit, coupled to the decoding unit for checking the associated metadata for each content element against the user-selected contents, and recording the content elements with the metadata substantially matching the user-selected contents into the storage device.

15. The playback device according to claim 14, wherein the metadata comprise the name and description of a current show for a TV or talk radio service or the artist and title of a song for a music radio service.

16. The playback device according to claim 14, wherein the storage device stores the metadata corresponding to the matched content elements, data generated based on analysis of the matched content elements, and related genres/artists of the matched content elements retrieved from an external database.

17. The playback device according to claim 11, wherein a selection of advertisements and associated keywords is loaded on the storage device by a device manufacturer and the advertisements and associated keywords are updated while the playback device is in a standby mode.

18. The playback device according to claim 11, wherein the monitor unit detects an ad break from the received digital audio/video services and recording advertisements of the ad break into the storage device, associating the recorded advertisements with a first set of keywords describing the content before the ad break, and associating the recorded advertisements with a second set of keywords describing the content after the ad break.

19. The playback device according to claim 11, wherein the monitor unit updates time-sensitive contents, comprising news, travel, and weather information, of the contents of the digital audio/video services recorded in the storage device.

* * * * *